UNITED STATES PATENT OFFICE 1,999,499

COMPOSITION OF MATTER AND ARTICLE PRODUCED THEREFROM

C. J. Burgess, Liberty, Mo.

No Drawing. Application April 25, 1932, Serial No. 607,513

5 Claims. (Cl. 252—2.5)

This invention relates to a composition of matter, the process of making the same and the actual article produced as a result of such process, and relates particularly to materials to be positioned in food storage compartments, especially in the line of travel of air circulating through such compartment.

It is well known in the preservation of foods that odors from one will be absorbed by another and that oftentimes it becomes necessary to entirely segregate certain food stuffs to preclude the absorption by one of objectionable odors given off by another.

It has been found that a composition for deodorizing circulating air is very effective if the same is made up of a number of elements, one of which is an activated carbon having the property of absorbing by occlusion, great volumes of gas and yet maintaining the power to be rejuvenated readily, simply by exposing the same to fresh air and sunlight.

It is understood that the following description disclosing the composition of matter entering into the production of such a deodorizing agent might be altered without greatly departing from the spirit of the invention and, while the same is especially adapted for use in domestic refrigerators, it is obvious that the mass of deodorizing or absorbing material might be used wherever the above set forth condition prevails.

The basic ingredient of the composition of matter is an activated carbon in powdered form and one which weights approximately 25 pounds to the cubic foot and that is exceedingly great in its power to absorb. With the carbon is intermixed calcium carbonate and Portland cement. Enough water is added to the three intermixed ingredients to create a plastic mass susceptible of being molded into cubes or bricks of a size best adapted for use in refrigerators of the ordinary domestic size. A batch should consist of one part activated carbon, two parts calcium carbonate, two parts Portland cement, and just enough water to render the mixture plastic.

With the above-mentioned amounts is added about one ounce of powdered aluminum or a similar oxidizible metal which has the property of combining with the water used for the purpose of throwing off gas, whereby ramified interconnected cavities are formed throughout the molded body of material and the buoyant carbon is carried to exposed surfaces. It is notable that the oxidization of aluminum occurs during the setting of the mass forming the body.

Since the absorption is directly commensurate with the area of surface contacted by traveling air, it is plain to be seen that the production of a large number of cavities will produce any amount of added contacting surface.

The carbon used in this composition of matter is, manifestly, the valuable agent. Calcium carbonate adds bulk and precludes the plastic material from sticking to the molds in which the bricks or blocks are formed. The Portland cement is the binder and the duty of a sufficient amount of water is obvious. Powdered aluminum, of which there is a very small amount, creates a gas within the mass during setting and when the mass of material has set, the block or brick is ready for positioning in a food compartment, from which it is desired to remove objectionable odors by absorption.

Having thus described the invention, what is claimed as new and desired to be secured by Letters Patent is:

1. A composition of mater of the character described consisting of one part by weight of activated carbon serving as an absorbing agent; two parts Portland cement serving as a binder for the mass; two parts calcium carbonate serving as a filler; water and powdered aluminum sufficient to generate gas within the mass and form a multiplicity of ramified interconnected cavities throughout the mass having a relatively greater concentration of activated carbon along the surfaces of the said ramified interconnected cavities than elsewhere in said mass.

2. The process of making a deodorizing composition which consists of intermixing activated carbon of high buoyancy and absorption power in a mass having Portland cement, water and powdered aluminum, said water being in a sufficient amount to saturate the Portland cement and the aluminum said aluminum and water forming gas to create ramified cavities within the mass, the formed gas serving to carry the particles of activated carbon to the walls of said ramified areas prior to setting of the mass whereby a relatively greater amount activated carbon is concentrated along the wall of the cavities to contact air to be purified as the hardened composition is being used.

3. In a deodorizing unit of the character described having a polygonal cementitious body, a plurality of ramified, interconnected passages formed throughout the body with termini of same at the body surfaces, said passages having their wall surfaces lined with particles of activated carbon in greater concentration than the concentration of carbon particles elsewhere in the said body.

4. A deodorizing unit of the character described, a body comprising a vehicle of Portland cement; particles of activated carbon supported by the Portland cement; and a plurality of ramified, interconnected passages formed in the body and having a greater concentration of carbon particles along their walls than at any other place within the body between said passages.

5. A deodorizing unit for food storage compartments comprising body having a plurality of ramified, interconnected passages formed throughout the same with their termini at the surface of the body; and a relatively heavy concentration of particles of activated carbon lining the surfaces of said passages, said body consisting of a vehicle of two parts Portland cement forming a binder for the same, two parts calcium carbonate serving as a filler, a small amount of powdered aluminum, and water, said water and aluminum being in sufficient amount prior to setting of the body to render the mixture plastic and to form gas for the purpose of creating the aforesaid passages, the said aluminum and water forming gas in sufficient volume to deposit said carbon particles in concentrated amounts along the said walls of the passages as the mass of said materials are setting to form a coherent body adaptable for use as specified.

C. J. BURGESS.